(12) United States Patent
Hirsius (10) Patent No.: US 10,894,175 B1
(45) Date of Patent: Jan. 19, 2021

(54) GLASS SHEARING APPARATUS

(71) Applicant: John Hirsius, Metairie, LA (US)

(72) Inventor: John Hirsius, Metairie, LA (US)

( * ) Notice: Subject to any disclaimer, the term of this patent is extended or adjusted under 35 U.S.C. 154(b) by 23 days.

(21) Appl. No.: 16/143,906

(22) Filed: Sep. 27, 2018

(51) Int. Cl.
*A62B 3/00* (2006.01)
*B60J 5/04* (2006.01)
*B60J 9/02* (2006.01)

(52) U.S. Cl.
CPC .............. *A62B 3/005* (2013.01); *B60J 5/0493* (2013.01); *B60J 9/02* (2013.01)

(58) Field of Classification Search
CPC . A62B 3/005; B60J 5/0493; B60J 1/00; B60J 9/02; Y10T 225/371; Y10T 225/30; Y10T 83/8782
See application file for complete search history.

(56) References Cited

U.S. PATENT DOCUMENTS

| | | | | |
|---|---|---|---|---|
| 2,713,278 A * | 7/1955 | Stump | ..................... | A62B 3/005 81/488 |
| 3,160,338 A * | 12/1964 | Widman | ..................... | B60J 1/00 225/93 |
| 3,243,222 A * | 3/1966 | Loughary | ............. | B60R 13/043 49/460 |
| 4,230,918 A * | 10/1980 | Schroeder | .................. | B60J 1/20 200/300 |
| 4,550,621 A * | 11/1985 | Rush | ....................... | G01N 27/60 74/2 |
| 4,974,365 A * | 12/1990 | Ono | ........................... | B60J 1/14 49/348 |
| 5,318,145 A * | 6/1994 | Vollmer | .................. | B60R 21/00 180/274 |
| 6,556,149 B1 * | 4/2003 | Reimer | .............. | H03K 17/9631 250/227.21 |
| 7,988,078 B1 * | 8/2011 | Roy | ........................ | A62B 3/005 241/33 |
| 8,419,062 B2 * | 4/2013 | Landini | .................... | B60R 21/13 280/756 |
| 8,505,348 B2 | 8/2013 | Colasse | | |
| 2003/0136009 A1 * | 7/2003 | McNeill | ................... | F42B 3/006 30/361 |
| 2004/0050607 A1 * | 3/2004 | Souther | .................. | A62B 3/005 180/271 |
| 2005/0082331 A1 * | 4/2005 | Yang | ...................... | A62B 3/005 225/2 |

(Continued)

*Primary Examiner* — Jonathan G Riley
(74) *Attorney, Agent, or Firm* — Sanchelima & Associates, P.A.; Christian Sanchelima; Jesus Sanchelima (57) ABSTRACT

The present invention is directed to a glass shearing apparatus. One application of the glass shearing apparatus is in vehicles. The apparatus comprises a handle provided at the vehicle door. The handle is coupled with at least one shearing means. The shearing means comprises a housing in which a window pane is supported. The shearing means further comprises a shear bolt that is coupled with the handle via a cable. In case of an emergency, the occupant of the vehicle actuates the handle thereby causing the cable to be tensioned, and the tensioned cable provides a drive to the shearing bolt, wherein the threadable engagement between an opening of the housing and the shearing bolt causes the translation of the shearing bolt within the opening. The translation of the shearing bolt within the opening is such that it eventually contacts the window pane and subsequently shears the window pane.

13 Claims, 9 Drawing Sheets

(56) References Cited

U.S. PATENT DOCUMENTS

| | | | |
|---|---|---|---|
| 2010/0194550 A1* | 8/2010 | Suzuki | G08B 13/04 340/426.1 |
| 2010/0301088 A1* | 12/2010 | Purdy | A62B 3/005 225/103 |
| 2013/0146381 A1* | 6/2013 | Oosterhuis | B60J 1/20 180/271 |
| 2018/0250533 A1* | 9/2018 | Petersen | A44B 11/005 |

* cited by examiner

GLASS SHEARING APPARATUS

BACKGROUND OF THE INVENTION

1. Field of the Invention

The present disclosure relates to a glass shearing apparatus. More particularly, the present disclosure relates a glass shearing apparatus to be employed on window panes of vehicles for facilitating shearing of the window panes in case of an emergency.

2. Description of the Related Art

Trapping of individuals inside vehicles during accidents is one of the major causes of fatalities. More specifically, at times, after an accident, the occupants of a vehicle can be alive but trapped in the vehicle, wherein the subsequent death of the occupants is caused due to the fact that they were trapped in the vehicle after the accident took place. Example of such a scenario can be an accident in which a vehicle is thrown into a water body or endangered by fire. Hence, there is felt a need for a glass shearing apparatus that can be used to shear the window panes of the vehicle in case of emergencies for providing an escape to the occupants.

Several designs for devices for shearing glass or window panes have been designed in the past. None of them, however, have been designed to be easily accessible to the occupants in case of emergency, while also being easily deployable.

Applicant believes that a related reference corresponds to U.S. Pat. No. 8,505,348 filed by Laurent Colasse for a key with spring-loaded window breaker. The Colasse reference discloses, in addition to conventional key electronics, a key that includes a glass-breaking spike, an open slot cutter for cutting seat belts and the like. However, the key disclosed in the Colasse reference, is just a key, which an occupant would have a hard time to find in case of an emergency, thereby potentially compromising an escape attempt made by the occupant.

Another related application is US Patent Publication no. 20100301088 filed by Ciaran Purdy and William Lee for a glass breaking device. The Purdy reference discloses a device for breaking glass, arranged to be mounted on a pane of a breakable substrate, and being actuatable to break the pane. However, the device disclosed in the Purdy reference is not configured for use on a window pane of a vehicle, and as such, lacks the components required for easy deployment of the device.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a glass shearing apparatus configured for use in vehicles.

It is still another object of the present invention to provide a glass shearing apparatus for use in vehicles, wherein the apparatus is easily accessible and easy to use in case of emergencies.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
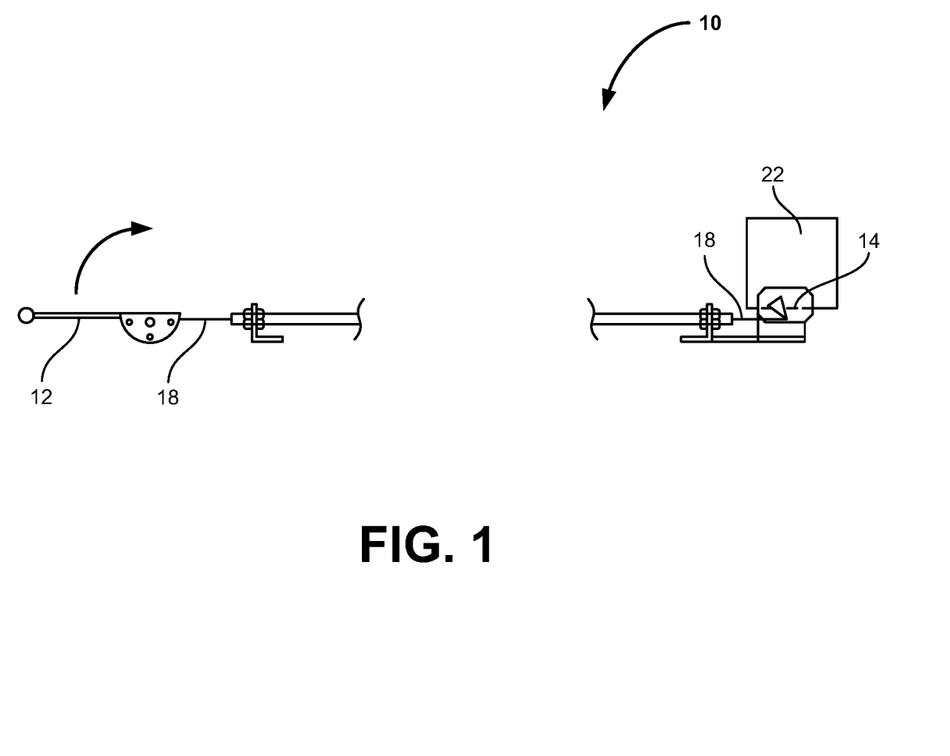
FIG. 1 illustrates a schematic view of main components of a glass shearing apparatus 10, which in accordance with the present invention, includes a handle 12 and shearing means 14.

Referring to FIG. 1, where a general working principle of a glass shearing apparatus, in accordance with the present invention, is referenced by the numeral 10. The glass shearing apparatus 10 (also referred to as apparatus 10) comprises a handle 12 and a shearing means 14 coupled to the handle 12. The 25 actuation of the handle 12, in the direction shown in FIG. 1, causes the actuation of the shearing means 14, which results in shattering of the glass sheet or a window pane of a vehicle in which the apparatus 10 is installed. The purpose of shattering the window pane is to allow the occupants of the vehicle to escape in case of emergencies.

Figure 2:
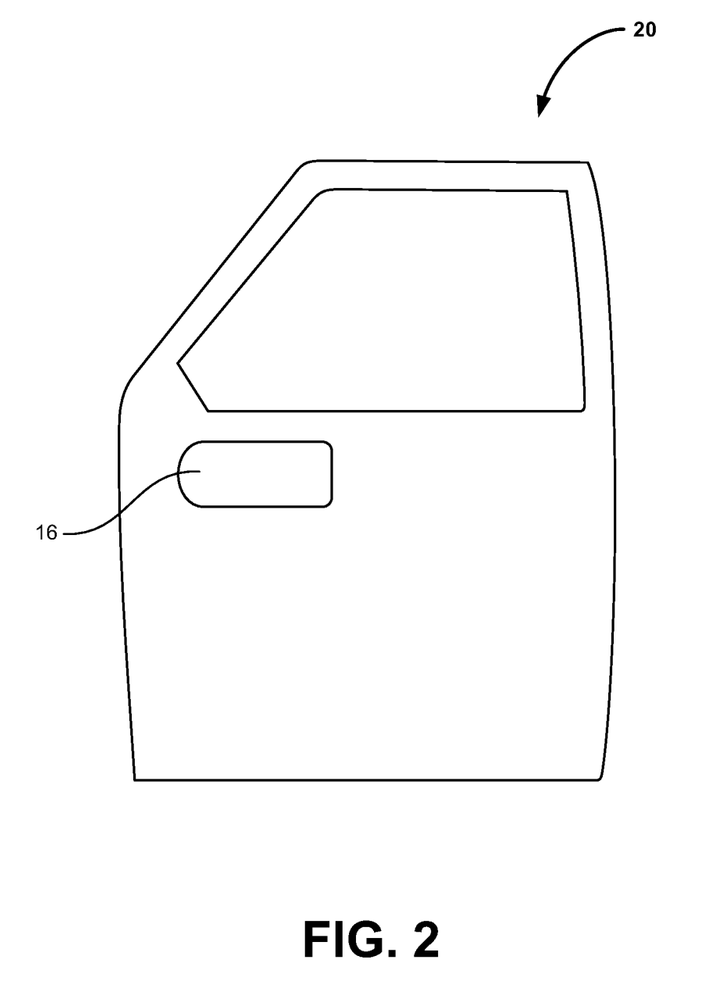
FIG. 2 represents front view of a vehicle door in which the glass shearing apparatus is installed, wherein the handle 12 of the glass shearing apparatus is covered by means of a flap 16.
Figure 3:
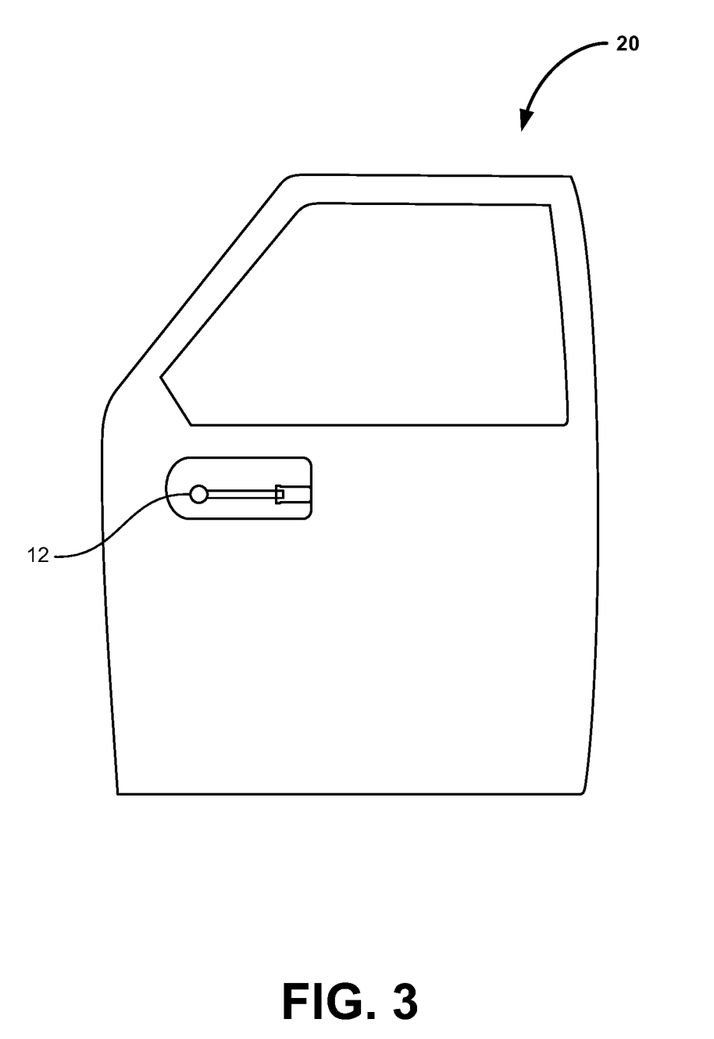
FIG. 3 represents front view of the vehicle door in which the glass shearing apparatus is installed, wherein the handle 12 of the glass shearing apparatus is uncovered.

FIGS. 2 and 3 illustrate the views of a vehicle door 20 on which the apparatus 10 is installed. In FIG. 2, the handle 12 of the apparatus 10, which is the only part of the apparatus 10 that can be seen by the user, is covered by means of a flap 16. In FIG. 3, the flap 16 is removed, thereby exposing the handle 12. In one embodiment, the flap 16 can be used for covering the handle 12 by means of hook and loop straps.

Figure 4:
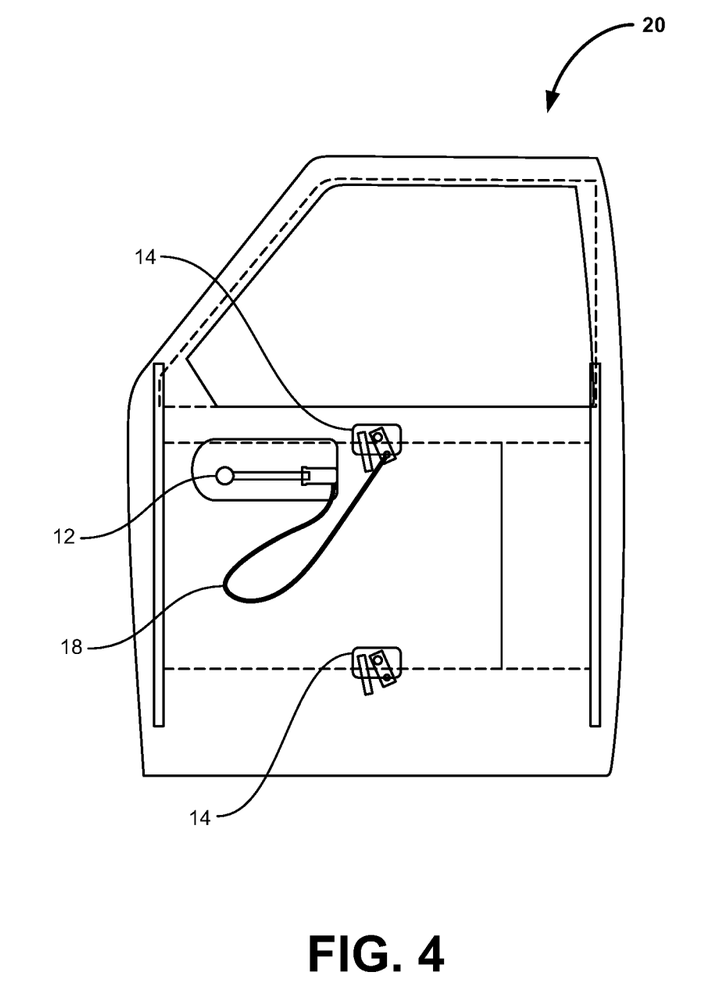
FIG. 4 represents front view of the vehicle door in which the glass shearing apparatus 10 is installed, wherein a cable 18 facilitates the coupling between the handle 12 and the shearing means 14.
Figure 5:
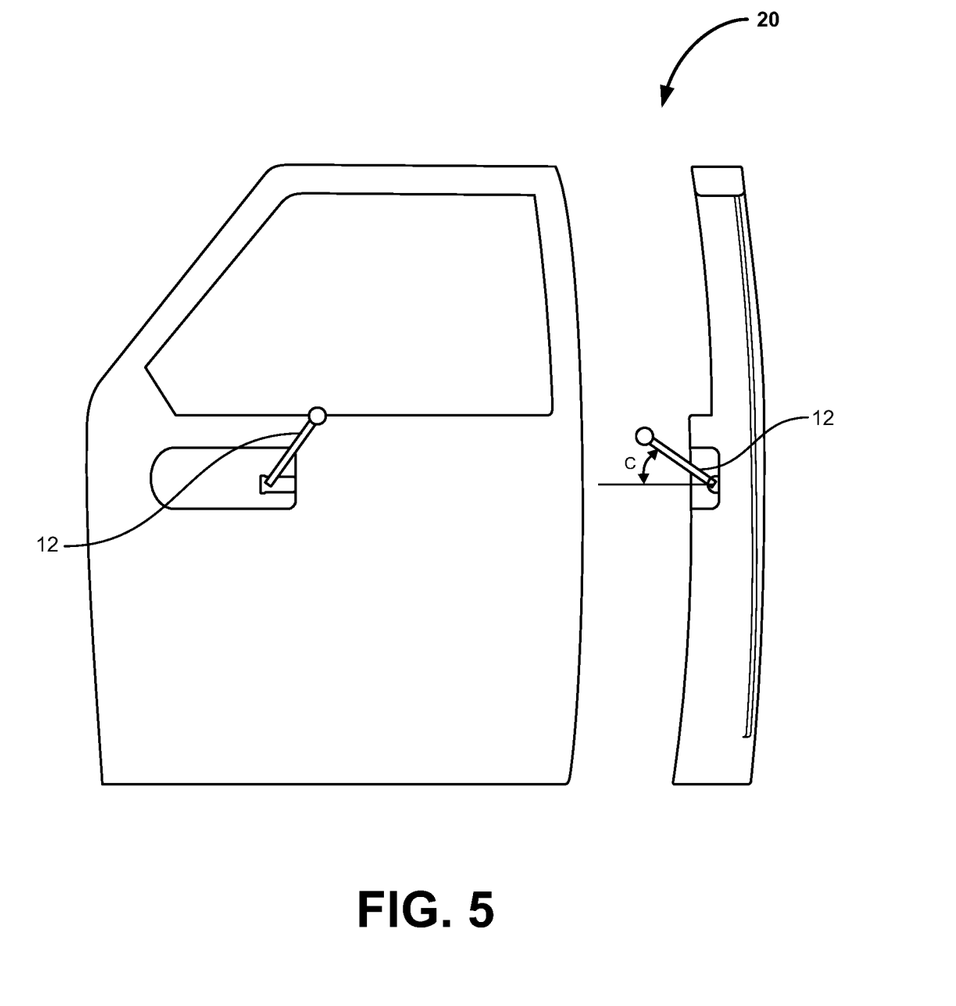
FIG. 5 represents front view of the vehicle door in which the glass shearing apparatus 10 is installed, wherein the handle 12 is in its extended actuated state.

Referring to FIG. 4, the vehicle door 20 is illustrated wherein it can be seen that the coupling between the handle 12 and the shearing means 14 is facilitated by a cable 18. FIG. 5 illustrates a view of the vehicle door 20 in which the handle 12 of the apparatus 10 is actuated. In an embodiment, the handle 12 pivotally extends from a pivot point on the vehicle door 20 at a pre-determined angle C. In one exemplary embodiment, the pre-determined C angle is 45°.

FIG. 6 thru FIG. 9 illustrate views of different elements of the handle 12, in accordance with the present invention.

Figure 6:
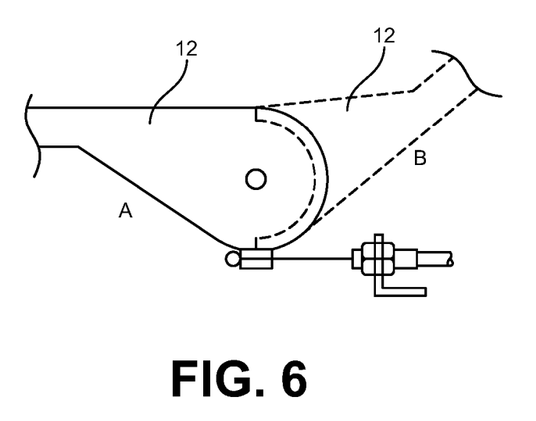
FIG. 6 thru FIG. 9 represent views of the different elements of the handle 12.
Figure 7:
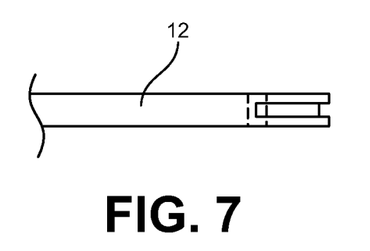
Figure 8:
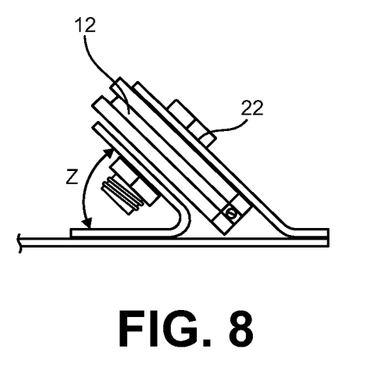
Figure 9:
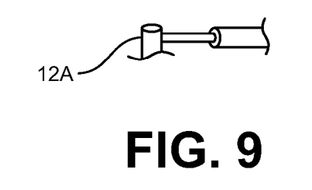

Referring to FIG. 6, position A of the handle 12 is its unactuated position, while position B, denoted by the dotted lines is the actuated position of the handle 12. As seen in FIG. 6, the cable 18 is coupled with the handle 12 such that the pivotal actuating motion of the handle 12 provides a pull to the cable 18, thereby tensioning the cable 18. FIG. 8 illustrates the view of a bracket 22 in which the handle 12 is disposed. The bracket 22 is mounted on the vehicle door 20. In one embodiment, the angle Z of the bracket 22 with respect to the vehicle door surface is 45°. As seen in FIG. 9, the handle 12 comprises a holding portion 12A that facilitates easy maneuvering of the handle 12 by the occupant.

Figure 10:
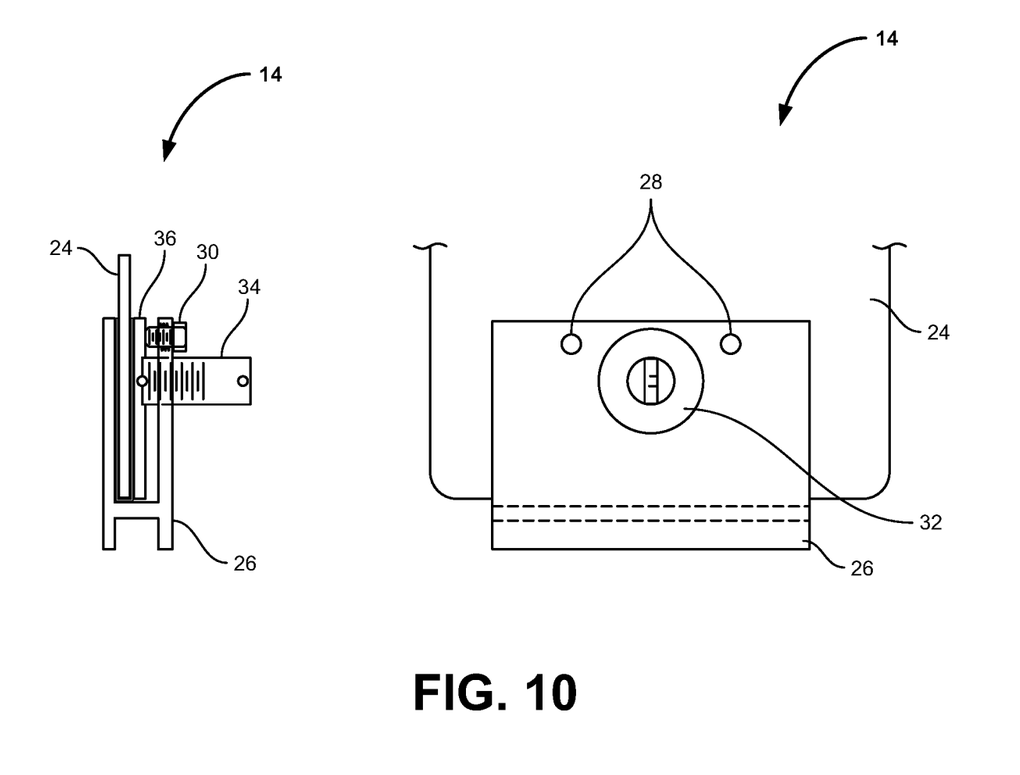
FIGS. 10 and 11 illustrate views of shearing means 14 in an inoperational configuration and operational configurations.
Figure 11:
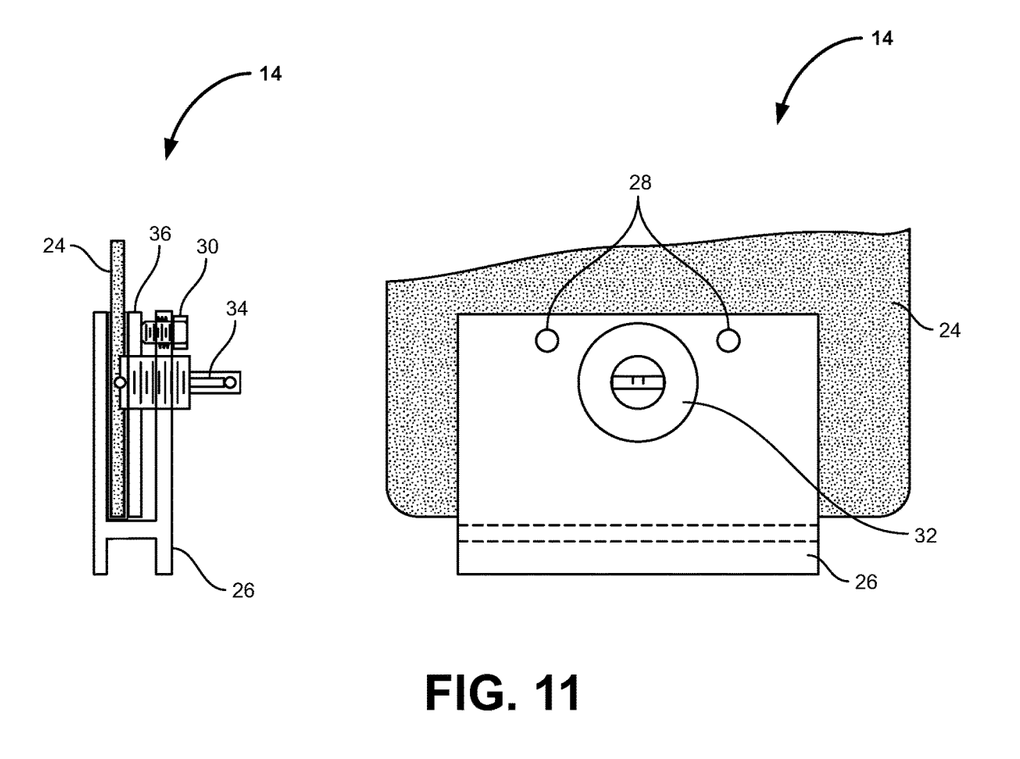

FIG. 10 illustrates the view of the shearing means 14, in accordance with the present invention. FIG. 11 illustrates the views of the shearing means 14, in accordance with the present invention, wherein the shearing means 14 is in its actuated state. Referring to FIGS. 10 and 11, the shearing means 14 is mounted on at least one location on a window pane 24. More specifically, the shearing means 14 comprises a housing 26. The housing 26, in one embodiment, can be a U shaped housing 26 for accommodating the window pane 24 and other elements of the shearing means 14. The housing 26 comprises a pair of apertures 28 provided thereon for facilitating coupling between the window pane 24 and the housing 26, wherein fasteners 30 are configured to be fastened within the apertures 28 for facilitating mounting of the shearing means on the window pane 24.

The shearing means 14 further comprises a drive wheel 32 coupled with a shearing bolt 34, wherein the housing 26 has an opening for threadably receiving the shearing bolt 34. The drive wheel 32 is coupled with the handle 12 via the cable 18. The actuation of the handle 12 causes the rotation of the drive wheel 32. The rotation of the drive wheel 32 causes the translation of the shearing bolt 34 within the opening of the housing 26. The translation of the shearing bolt 34 within the opening of the housing 26 eventually causes the shearing bolt 34 to advance further and shear the window pane 24 that is placed within the housing 26, as can be seen in FIG. 11.

The shearing means 14 further comprises a metal spacer 36 disposed within the housing 26 adjacent a front surface of the window pane 24, wherein for the sake of the present disclosure, the front surface of the window pane 24 is considered to be that surface of the window pane 24 which comes in contact with the shearing bolt 34. The shearing means 14 further comprises a resilient pad 38 disposed within the housing 26 adjacent a back surface of the window pane 24.

Figure 12:
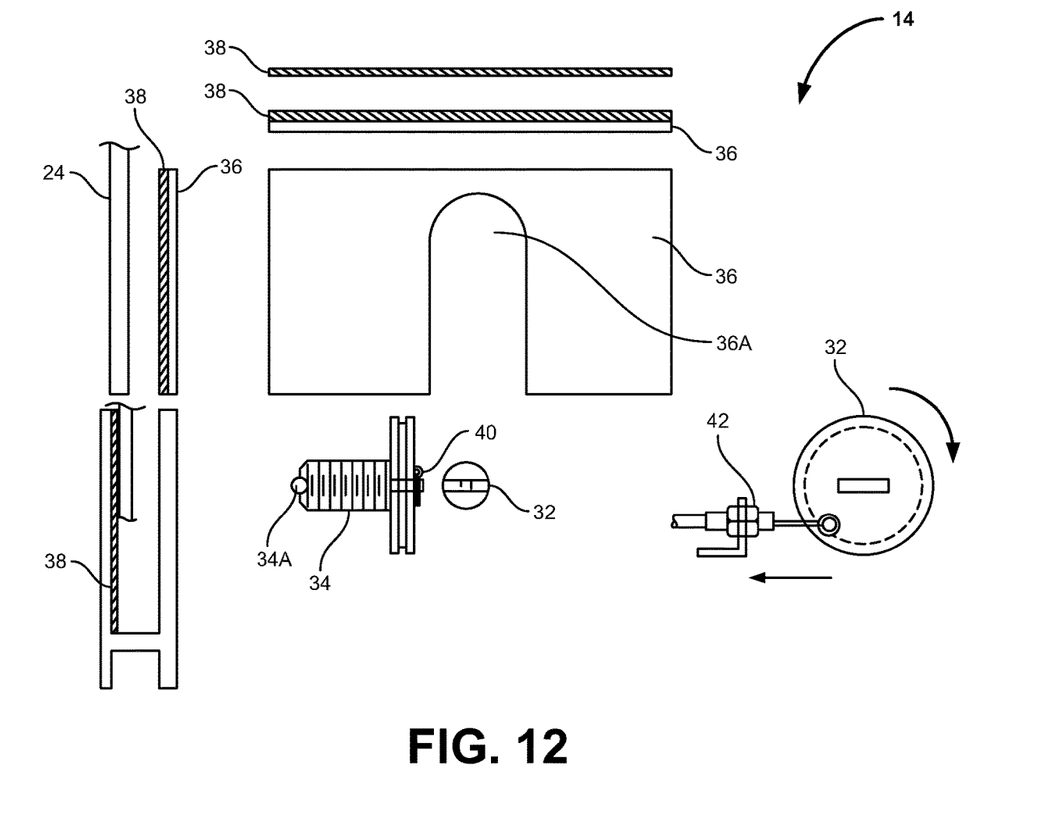
FIG. 12 represents views of the different elements of the shearing means 14.

Referring to FIG. 12, different components of the shearing means 14 are illustrated. In an embodiment, the metal spacer 36 is provided with an additional resilient pad 38 for sandwiching the window pane 24 between the metal spacer 36 and the resilient pad 38 provided adjacent the back surface of the window pane 24.

As seen in FIG. 12, the metal spacer 36 is provided with a cut out 36A. The cut out 36A allows the shearing bolt 34 to pass right through the metal spacer 36 for effecting the shearing of the window pane 24. Furthermore, the shearing bolt 34 is provided with a potted ball bearing 34A provided at the operative end of the shearing bolt 34 that is supposed to contact the window pane 24 for effecting the shearing thereof.

In an embodiment, the shearing means 14 further comprises a cotter pin 40 for facilitating the coupling between the cable 18 and the drive wheel 32. The shearing means 14, can further comprise, a cable stop 42 provided to prevent the accidental relief of tension in the cable 18 by accidental reverse rotation of the drive wheel 32, in case of emergencies.

The operative configuration of the apparatus 10 is hereinafter described. In case of an emergency, the occupant of the vehicle can pull the handle 12 out of the bracket 22, followed by actuating the handle 12. Once the handle 12 is actuated, the cable 18 is tensioned, and the tensioned cable 18 provides a drive to the drive wheel 32. The shearing bolt 34, which is coupled with the drive wheel 32, receives the drive from the drive wheel 32, wherein the threadable engagement between the opening of the housing 26 and the shearing bolt 34 causes the translation of the shearing bolt 34 within the opening. The translation of the shearing bolt 34 within the opening is such that eventually the potted ball bearing 34A of the shearing bolt 34 contacts the window pane 24 and subsequently shears the window pane 24. The occupants are provided with an opportunity of escape once the window pane 24 is shattered.

It is to be noted that the above description has been explained in a manner that the use of only one shearing means 14 has been described. However, the number of shearing means can be any, as per the application requirements. For example, window panes of some vehicles may be large, in which case only one or two shearing means 14 may not suffice to effect the shearing of the complete window pane. In such a case, three, four or more shearing means can be provided at different locations on the window pane, wherein, in accordance with one embodiment, all of the shearing means can be actuated using the single handle 12.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An emergency escape apparatus for vehicles, the apparatus comprising:
   a. a handle, a vehicle door, said handle provided on an inner side of the vehicle door, the handle being accessible to an occupant of the vehicle; and
   b. a shearing member operably coupled to the handle, a window pane, said shearing member including a housing mounted within said vehicle door, said window pane being mounted within said housing such that a bottom edge of said window pane is partially in constant contact with said housing, the shearing member configured to shatter a window pane housed within the vehicle door on actuation of the handle by the user, thereby allowing an escape opportunity to the occupant in case of emergencies, the shearing member further includes a drive wheel coupled to the handle, a shearing bolt coupled to the drive wheel such that the rotation of the drive wheel causes a linear motion of the shearing bolt, said shearing bolt including a potted ball bearing at a distal end thereof, wherein the shearing bolt and the drive wheel are supported on an external surface of the housing such that the shearing bolt can pass into the interior of the housing when the drive wheel is rotated to cause the shattering of the window pane upon said potted ball bearing making contact with said window pane.

2. The apparatus as claimed in claim 1, wherein the handle is coupled to the drive wheel via a cable.

3. The apparatus as claimed in claim 2, wherein the actuation of the handle causes tensioning of the cable which effects the rotation of the drive wheel, thereby causing the linear motion of the shearing bolt into the housing.

4. The apparatus as claimed in claim 3, further including a metal spacer disposed operatively in front of the window pane and a resilient pad disposed operatively behind the window pane.

5. The apparatus as claimed in claim 4, wherein the metal spacer has a cut out configured therethrough to allow the shearing bolt to pass through the metal spacer when the handle is actuated, said cut out being concave and centrally located on said metal spacer.

6. The apparatus as claimed in claim 2, wherein the shearing member further includes a cotter pin for facilitating the coupling between the cable and the drive wheel.

7. The apparatus as claimed in claim 1, wherein said housing is substantially U shaped.

8. The apparatus as claimed in claim 1, wherein said housing has a housing width and said window pane has a window pane width, said window pane width being greater than said housing width.

9. The apparatus as claimed in claim 1, wherein said housing and said window pane are in constant contact and move vertically simultaneously with one another.

10. The apparatus as claimed in claim 1, wherein said housing includes apertures for securing said window pane to said housing, fasteners are received through said apertures to secure said window pane and said housing together.

11. The apparatus as claimed in claim 10, wherein said apertures are parallel to each other, said drive wheel being in between said apertures.

12. The apparatus as claimed in claim 1, wherein said shearing bolt is perpendicular to said housing, said shearing bolt partially extending outwardly and away from said housing.

13. The apparatus as claimed in claim 4, wherein said metal spacer, said resilient pad and said window pane are vertical and parallel to each other.

* * * * *